(12) United States Patent
Roh et al.

(10) Patent No.: US 8,498,782 B2
(45) Date of Patent: Jul. 30, 2013

(54) APPARATUS FOR KEEPING A TRAFFIC LANE AND PREVENTING LANE-DEVIATION FOR A VEHICLE AND METHOD THEREOF

(75) Inventors: Myung-Chan Roh, Daejeon (KR); Jae-Min Byun, Gyeryong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 321 days.

(21) Appl. No.: 12/888,036

(22) Filed: Sep. 22, 2010

(65) Prior Publication Data

US 2011/0125369 A1 May 26, 2011

(30) Foreign Application Priority Data

Nov. 10, 2009 (KR) ........................ 10-2009-0108158

(51) Int. Cl.
*G06F 17/00* (2006.01)
(52) U.S. Cl.
USPC ............................................. 701/41

(58) Field of Classification Search
USPC ................... 701/41, 117, 408, 409, 412, 540, 701/300, 301
See application file for complete search history.

(56) References Cited

U.S. PATENT DOCUMENTS

2006/0233424 A1* 10/2006 Miyajima et al. ............. 382/104
2007/0233386 A1* 10/2007 Saito et al. .................... 701/300

FOREIGN PATENT DOCUMENTS

| JP | 2004-199286 | 7/2004 |
| JP | 2007-106250 | 4/2007 |
| JP | 2007-266975 | 10/2007 |
| KR | 10-0835803 | 5/2008 |

* cited by examiner

*Primary Examiner* — Kim T Nguyen
(74) *Attorney, Agent, or Firm* — Nelson Mullins Riley & Scarborough LLP; EuiHoon Lee, Esq.

(57) ABSTRACT

The present invention relates to an apparatus for keeping a traffic lane and preventing lane-deviation for a vehicle that controls a steering direction and a steering amount so as for the vehicle to keep the traffic lane by using information on a left traffic lane of a vehicle while travelling and information on a curbstone provided at a right side of the vehicle and a method thereof.

10 Claims, 7 Drawing Sheets

FIG.6

| ID | X-AXIS POSITION | Y-AXIS POSITION | ROAD WIDTH | DISTANCE BETWEEN RIGHT TRAFFIC LANE AND CURBSTONE | ALLOWANCE DISTANCE UP TO CURBSTONE |
|---|---|---|---|---|---|
| 1 | 127.1 | 36.1 | 360 | 50 | 200 |
| 2 | 127.12 | 36.12 | 320 | 60 | 180 |
| ... | ... | ... | ... | ... | ... |

APPARATUS FOR KEEPING A TRAFFIC LANE AND PREVENTING LANE-DEVIATION FOR A VEHICLE AND METHOD THEREOF

CROSS REFERENCE TO RELATED APPLICATIONS

This application claims priority to Korean Patent Application No. 10-2009-0108158 filed on Nov. 10, 2009, the entire contents of which are herein incorporated by reference.

BACKGROUND OF THE INVENTION

1. Field of the Invention

The present invention relates to an apparatus for keeping a traffic lane and preventing lane-deviation for a vehicle and a method thereof. More particularly, the present invention relates to an apparatus for keeping a traffic lane and preventing lane-deviation for a vehicle that controls a steering direction and a steering amount so as for the vehicle to keep the traffic lane by using information on a left traffic lane of a vehicle while travelling and information on a curbstone provided at a right side of the vehicle and a method thereof.

2. Description of the Related Art

In recent years, by observing from a car accident that shows an increase of death to riders due to accidents between cars, an automotive industry is motivated to introduce an automotive safety device for preventing car accidents and protecting the riders when the accident occurs. This is a global trend and world countries primarily including developed countries have hastened to develop and introduce an automotive safety device as a countermeasure for the increase in traffic accidents. According to these trends, a safety device for promoting a driver's safety, an additional device for driving convenience, and various travelling control devices are being applied to cars.

Technologies applied to the travelling control devices include an autonomous steering control technology of autonomously controlling a steering angle of a steering device (e.g., handle) of the vehicle by using information on a left traffic lane and a right traffic lane of the vehicle acquired by using a camera in accordance with a geometric state of a road and a traffic lane deviation (lane-deviation) prevention warning technology for preventing a safety accident generated when the vehicle breaks away the left traffic lane or the right traffic lane while travelling.

In a known travelling control technology using a camera, it is frequent that an image is not normally photographed due to back light which may be generated depending on a travelling direction of the vehicle. As a result, there is a high possibility that since a traffic lane is not accurately recognized from a photographed image, there is a high possibility that steering control cannot be performed or a misoperation will occur due to misrecognition.

In particular, in the prior art, in the case in which the width of the road is variable or in the case of a one-way lane, right traffic lane information may not be acquired or the vehicle may break away the traffic lane due to misoperation by misrecognition.

SUMMARY OF THE INVENTION

The present invention is contrived to solve the above-mentioned problems. An object of the present invention is to solve a difficulty in collecting images and misrecognition of a traffic lane which may be generated due to back light in image based traffic recognition for travelling control by closely photographing and detecting a left traffic lane of a vehicle.

Further, another object of the present invention is to provide an apparatus for keeping a traffic lane and preventing lane-deviation for a vehicle that solve problems generated due to misrecognition and non-acquisition of right traffic lane information in the prior art and enables safe travelling while keeping a travelling traffic lane right even in a variable road environment by using curbstone information for travelling control for keeping the traffic lane and preventing lane-deviation for the vehicle.

According to an aspect of the present invention, there is an apparatus for keeping a traffic lane and preventing lane-deviation for a vehicle that includes: a traffic lane recognizer extracting traffic lane information from an image of a road at the left side of the vehicle, the image photographed through an image photographing device; a curbstone recognizer extracting information on a curbstone positioned at the right side of the vehicle from distance information between the distance measuring device and a right ground surface of the vehicle measured by the distance measuring device; a position recognizer acquiring positional information of the vehicle by using a global positioning system and extracting road information corresponding to a current position of the vehicle from a road information database by using the acquired positional information; a traffic lane information integrator generating a virtual traffic lane on the basis of the extracted road information, traffic lane information, and curbstone information; a steering control calculator calculating a steering value for controlling a steering device on the basis of the generated virtual traffic lane and a center point of the vehicle; and a steering device of the vehicle controller controlling the steering device on the basis of the calculated steering value.

In particular, the distance measuring device measures a distance between the distance measuring device and the road surface at the right side of the vehicle by using a laser.

Further, the image photographing device and the distance measuring device are, in a line, arranged on the same line of upper right and left ends of the vehicle.

In addition, the image photographing device is disposed on an upper left end of the vehicle and a view direction of the image photographing device is vertical to a ground surface.

Besides, the apparatus for keeping a traffic lane of a vehicle and preventing lane-deviation further includes a display displaying the steering value for steering the steering device and the control result data received from the steering device controller.

Moreover, the steering value for controlling the steering device includes information on a steering direction and a steering angle.

Further, the traffic lane information integrator includes: a traffic lane distance calculating unit calculating a distance between the image photographing device and the traffic lane by using the traffic lane information extracted by the traffic lane recognizer; a curbstone distance calculating unit calculating a distance between the distance measuring device and the curbstone by using the curbstone information extracted by the curbstone recognizer; and a travelling traffic lane generating unit generating the virtual travelling traffic lane by using the distance values calculated by the traffic lane distance calculating unit and the curbstone distance calculating unit.

Meanwhile, according to another aspect of the present invention, there is a method for keeping a traffic lane and preventing lane-deviation for a vehicle that includes: photographing a road at the left side of the vehicle through an image photographing device and extracting traffic lane information from the photographed road image; measuring a distance between a distance measuring device and a right ground surface of the vehicle through the distance measuring device and extracting information on a curbstone positioned at the right side of the vehicle from the measured distance information; acquiring positional information of the vehicle by using a global positioning system and extracting road information corresponding to a current position of the vehicle from a road information database by using the acquired positional information; generating a virtual traffic lane on the basis of the extracted road information, traffic lane information, and curbstone information; calculating a steering value for controlling a steering device of the vehicle on the basis of the generated virtual traffic lane and a center point of the vehicle; and controlling the steering device on the basis of the calculated steering value.

In particular, the method for keeping a traffic lane of a vehicle and preventing lane-deviation further includes displaying the steering value for steering the steering device and the control result data according to controlling the steering device to a driver on the basis of the steering value.

Further, the steering value for controlling the steering device includes information on a steering direction and a steering angle.

Besides, the photographing a road at the left side of the vehicle through an image photographing device photographs the road at the left side of the vehicle by disposing a view direction of the image photographing device to be vertical to the ground surface.

Moreover, the generating a virtual traffic lane on the basis of the extracted road information, traffic lane information, and curbstone information includes: calculating unit calculating a distance between the image photographing device and the traffic lane by using the extracted traffic lane information and calculating a distance between the distance measuring device and the curbstone by using the curbstone information; and generating a virtual travelling traffic lane by using the calculated distance values.

According to an embodiment of the present invention, the following effects can be expected.

It is possible to solve problems generated due to misrecognition and non-acquisition of right traffic lane information in the prior art and enables safe travelling while keeping a travelling traffic lane right even in a variable road environment, by using a curbstone information for travelling control in order to keep a traffic lane of a vehicle and prevent lane-deviation.

BRIEF DESCRIPTION OF THE DRAWINGS

FIG. 6 shows one example of a road information table stored in a road information DB;

DETAILED DESCRIPTION OF THE PREFERRED EMBODIMENTS

Hereinafter, the present invention will be described in detail with reference to the accompanying drawings. Herein, the detailed description of a related known function or configuration that may make the purpose of the present invention unnecessarily ambiguous in describing the present invention will be omitted. Embodiments of the present invention are provided so that those skilled in the art may more completely understand the present invention. Accordingly, the shape, the size, etc., of elements in the figures may be exaggerated for more explicit comprehension.

Figure 1:
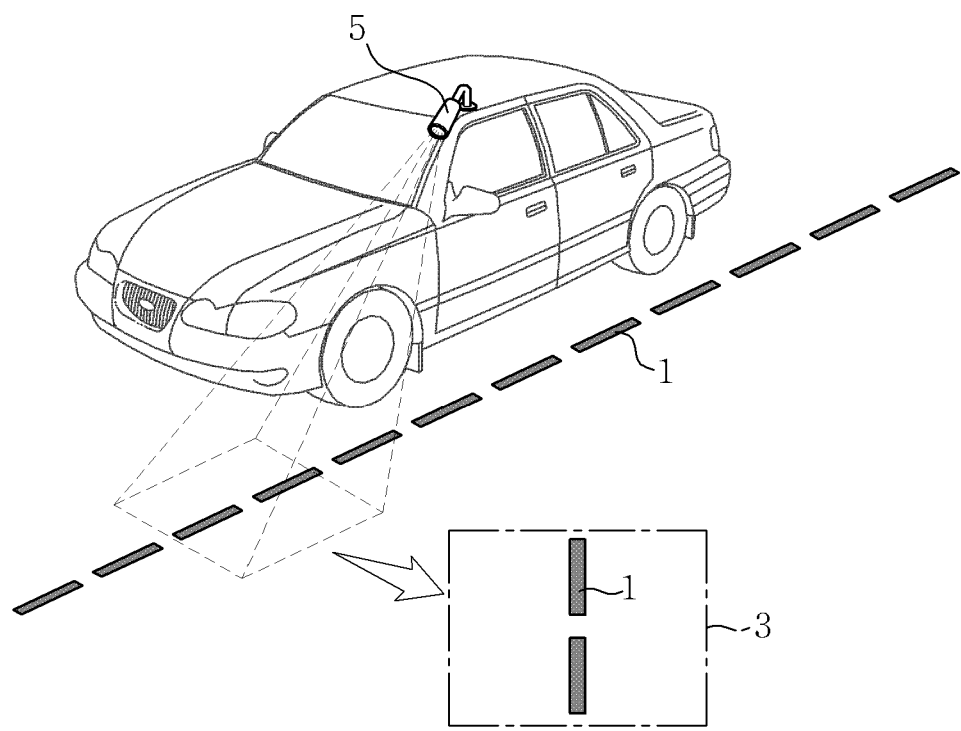
FIG. 1 is a diagram showing a mounting position and a photographing range of an image photographing device according to an embodiment of the present invention.

FIG. 1 is a diagram showing a mounting position and a photographing range of an image photographing device according to an embodiment of the present invention.

Referring to FIG. 1, the image photographing device 5 for acquiring traffic lane information 1 of a road is mounted on an upper left end of a vehicle and photographs a road at the left side of the vehicle to acquire a road image 3. In this case, the image photographing device 5 is installed so as for a view direction of the image photographing device 5 to be vertical to the surface of the road or substantially vertical to the surface of the road. As the view direction of the image photographing device 5 is vertical to the ground surface, a difficulty of image collection and traffic lane misrecognition which may be generated by back light can be prevented. However, in FIG. 1, the view direction of the image photographing device 5 faces a left front surface of the vehicle for helping understanding of the present invention.

Figure 2:
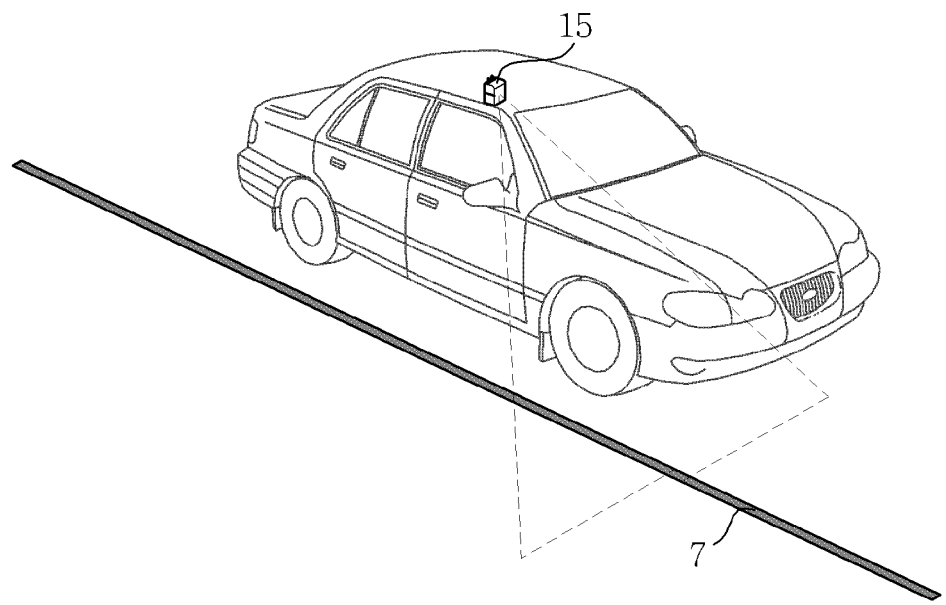
FIG. 2 is a diagram showing a mounting position and a measurement range of a distance measuring device according to an embodiment of the present invention.

FIG. 2 is a diagram showing a mounting position and a measurement range of a distance measuring device according to an embodiment of the present invention.

Figure 3:
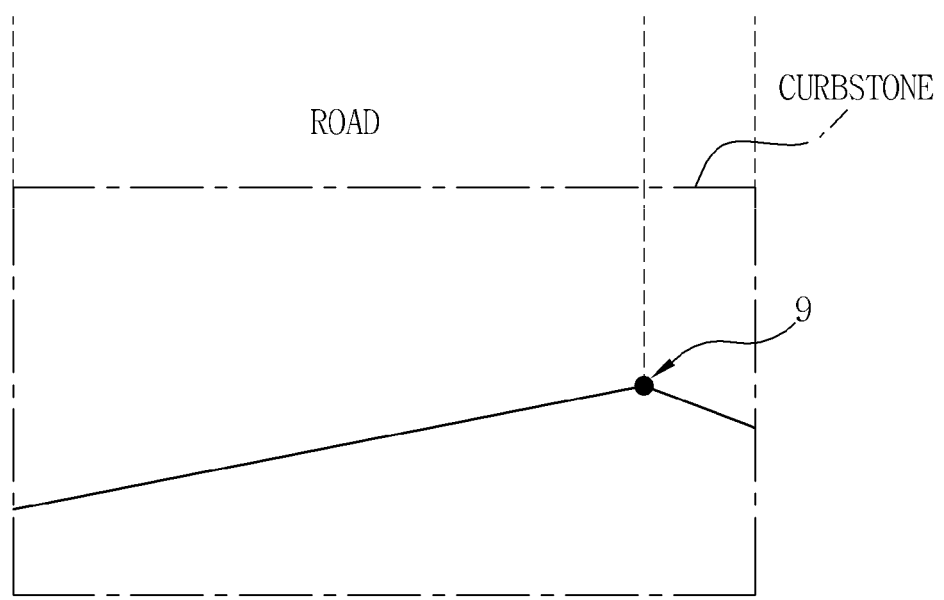
FIG. 3 is a diagram drawing distance information measured through a distance measuring device of FIG. 2 as a straight line.

Referring to FIG. 2, the distance measuring device 15 for acquiring curbstone information according to the embodiment of the present invention is mounted on an upper right end of a vehicle and measures a distance from a ground surface at the right side of the vehicle. The distance measuring device 15 may use a laser in order to measure the distance from the ground surface at the right side of the vehicle. More specifically, the distance measuring device 15 irradiates a laser beam in the direction of the curbstone (also referred to as 'kerbstone') at regular intervals and detects the laser beam reflected on the ground surface and returned to measure a distance between itself and the right-side ground surface. Continuous points (distance value) depending on the distance are expressed by a straight line as shown in FIG. 3. When a feature point extraction algorithm is applied in the straight line, a point 9 where a road surface and the curbstone meet each other can be acquired.

For example, assuming that the distance measuring device 15 is mounted on the upper right front surface of the vehicle and measures a distance from the ground surface in a predetermined block including the road surface and the curbstone as shown in FIG. 2, a distance value increase as the ground surface is farther from the vehicle and the distance value decreases in a predetermined block from the point 9 where the road surface and the curbstone meet each other (proportional to the height of the curbstone) as shown in FIG. 3.

Meanwhile, for an effective embodiment of the present invention, it is preferable that the image photographing device 5 and the distance measuring device 15 are, in a line, arranged on the same line of upper right and left ends of the vehicle.

Figure 4:
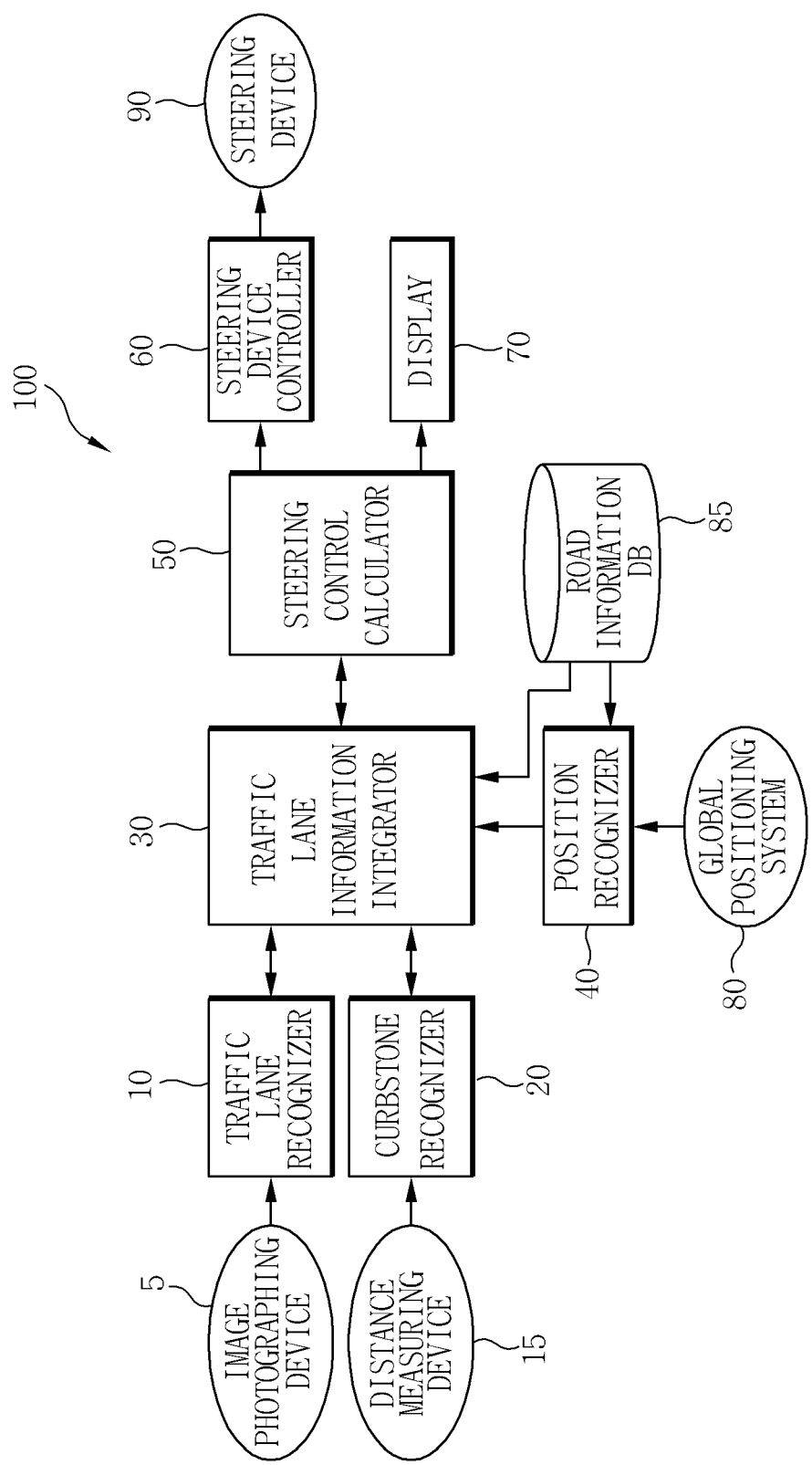
FIG. 4 is a diagram for describing an apparatus for keeping a traffic lane and preventing lane-deviation for a vehicle according to an embodiment of the present invention.
Figure 5:
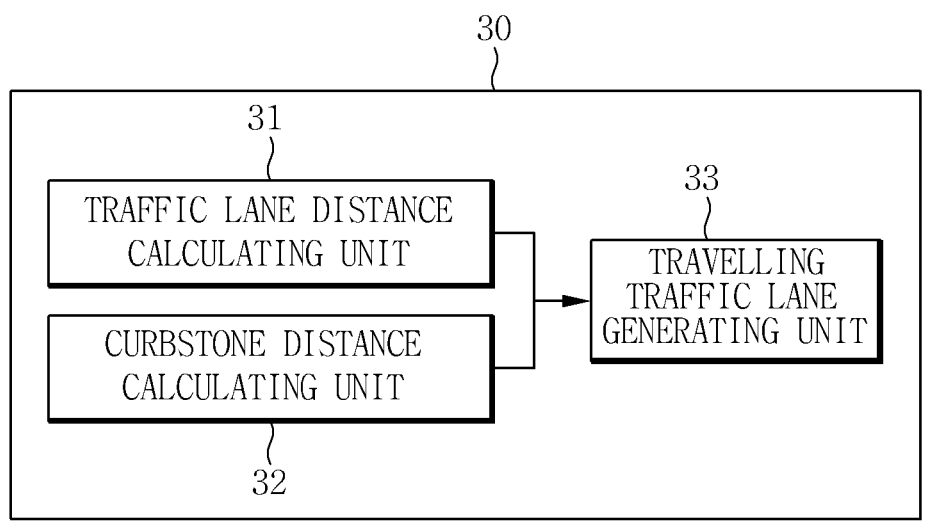
FIG. 5 is a diagram for describing a configuration of a vehicle information integrator shown in FIG. 4 in more detail.

FIG. 4 is a diagram for describing an apparatus for keeping a traffic lane and preventing lane-deviation for a vehicle according to an embodiment of the present invention. In addition, FIG. 5 is a diagram for describing a configuration of a traffic lane information integrator 30 shown in FIG. 4 in more detail.

Referring to FIG. 4, the apparatus for keeping a traffic lane and preventing lane-deviation of a vehicle includes an image photographing device 5, a traffic lane recognizer 10, a distance measuring device 15, a curbstone recognizer 20, a traffic lane information integrator 30, a position recognizer 40, a steering control calculator 50, a steering device controller 60, a display 70, a global positioning system 80, and a road information database 85 (hereinafter, referred to as 'road information DB').

The image photographing device 5 is mounted on the upper left end of the vehicle and acquires a road image by photographing a road at the left side of the vehicle. For example, a camera may be used as the image photographing device 5 of the present invention.

The traffic lane recognizer 10 receives the photographed image of the road at the left side of the vehicle through the image photographing device 5 and extracts traffic lane information from the road image.

The distance measuring device 15 is mounted on the upper right end of the vehicle and measures a distance from a right ground surface of the vehicle. The right ground surface of the vehicle is a ground surface at the right side of the vehicle.

The curbstone recognizer 20 extracts information on a curbstone positioned at the right side of the vehicle from the distance information between the distance measuring device 15 and the right ground surface of the vehicle measured by the distance measuring device 15.

The position recognizer 40 acquires positional information of the vehicle by using the global positioning system (GPS) 80 and extracts road information corresponding to a current position of the vehicle from the road DB 85 by using the acquired positional information. FIG. 6 shows one example of a road information table stored in a road information DB 85.

The traffic lane information integrator 30 generates a virtual traffic lane on the basis of the road information, traffic lane information, and curbstone information extracted by the traffic lane recognizer 10, the curbstone recognizer 20, and the position recognizer 40.

For this the traffic lane information integrator 30 includes a traffic lane distance calculating unit 31, a curbstone distance calculating unit 32, and a travelling traffic lane generating unit 33.

The traffic lane distance calculating unit 31 calculates a distance between the image photographing device 5 installed in the vehicle and the traffic lane by using the traffic lane information acquired by the traffic lane recognizer 10 and transfers the calculated distance value to the travelling traffic lane generating unit 33 in order to generate a virtual travelling traffic lane.

The curbstone distance calculating unit 32 calculates a distance between the distance measuring device 15 installed in the vehicle and the curbstone by using the curbstone information acquired by the curbstone recognizer 20 and transfers the calculated distance value to the travelling traffic lane generating unit 33 in order to generate the virtual travelling traffic lane.

The travelling traffic lane generating unit 33 generates the virtual travelling traffic lane by using the distance values received from the traffic lane distance calculating unit 31 and the curbstone distance calculating unit 32 and the road information received from the position recognizer 40.

Meanwhile, the steering control calculator 50 calculates a steering value for controlling the steering device 90 of the vehicle on the basis of a virtual traffic lane generated by the traffic lane information integrator 30 and a center point of the vehicle.

In addition, the steering device controller 60 controls the steering device 90 on the basis of the steering value calculated by the steering control calculator 50. The steering value calculated by the steering device calculator 50 includes information on a steering direction and a steering angle. The steering device controller 60 controls the steering device 90 on the basis of the information.

The display 70 displays operation performing results of the components to a driver to allow the driver to check a current travelling condition of his/her own vehicle. The display 70 may include at least one of a liquid crystal display (LCD), a thin film transistor liquid crystal display (TFT LCD), an organic light emitting diode (OLED), a flexible display, and a 3D display.

Figure 7:
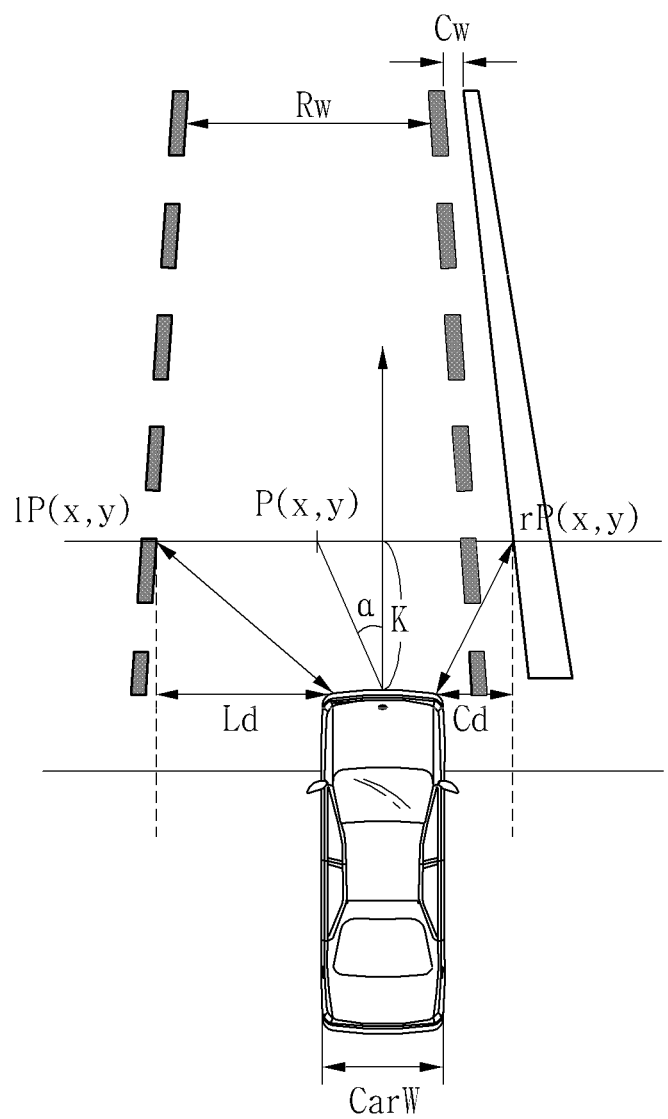
FIG. 7 is a geometric relation diagram between a vehicle and a road surface.

FIG. 7 is a geometric relationship diagram between a vehicle and a road surface. In addition, FIG. 8 is a flowchart for describing a method for keeping a traffic lane of a vehicle and preventing lane-deviation according to an embodiment of the present invention.

Figure 8:
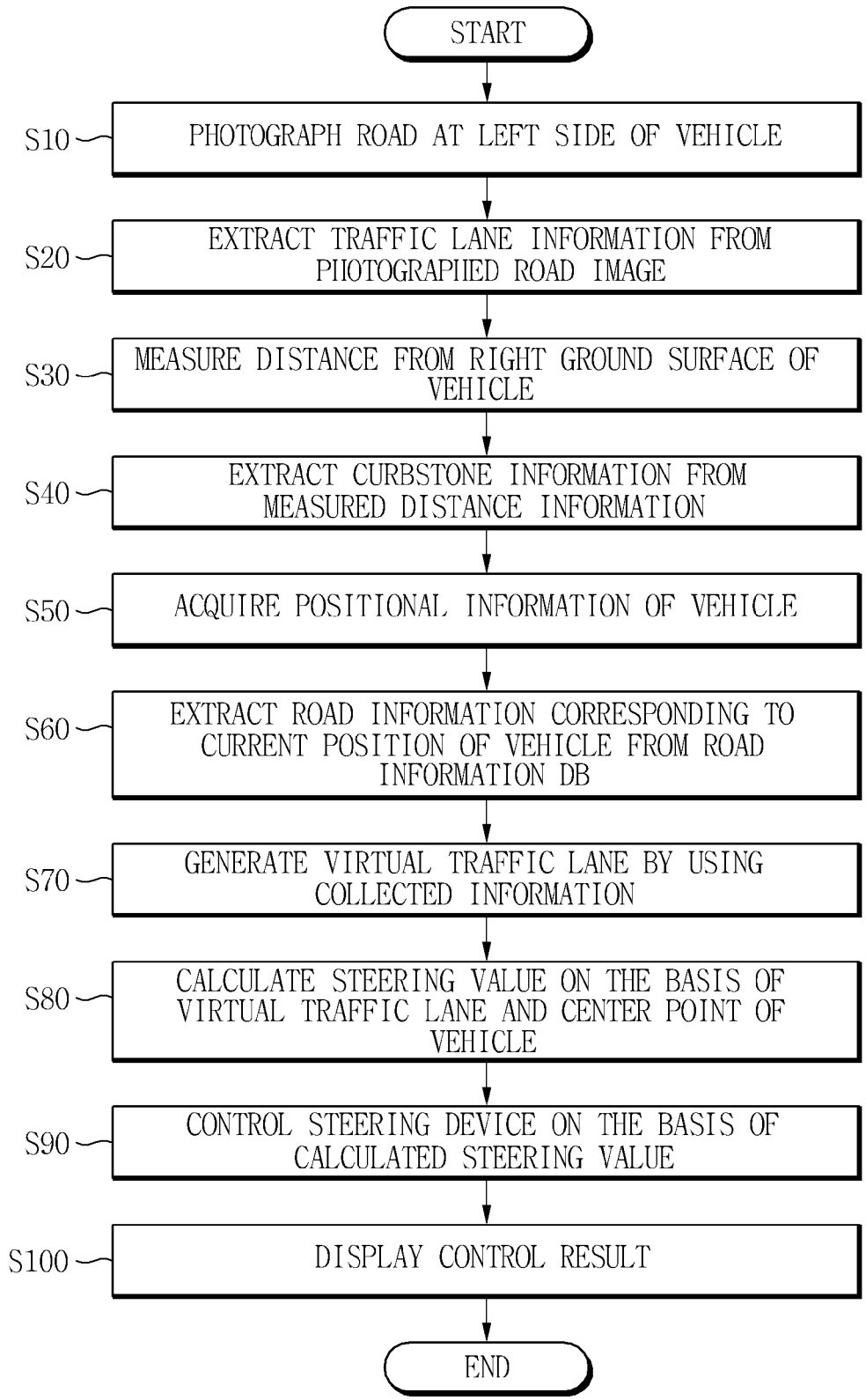
FIG. 8 is a flowchart for describing an apparatus and a method for keeping a traffic lane and preventing lane-deviation for a vehicle according to an embodiment of the present invention.

Referring to FIGS. 7 and 8, a road at the left side of the vehicle is photographed by using an image photographing device 5 (S10) and traffic lane information is extracted from the photographed road image (S20).

In addition, a distance between a distance measuring device 15 and a road ground surface at the right side of the vehicle is measured by using the distance measuring device 15 installed on an upper right end of the vehicle (S30) and information on a curbstone positioned at the right side of the vehicle is extracted from the measured distance information (S40).

Meanwhile, although the above-mentioned steps are sequentially performed as time elapses in FIG. 7, steps S10 and S30 are preferably performed at the same time.

Next, positional information of the vehicle is acquired by using a global positioning system 80 (S40) and road information corresponding to a current position of the vehicle is extracted from a road information DB 85 by using the acquired positional information (S60).

Next, a virtual traffic lane is generated on the basis of the road information extracted at step S60, the traffic lane information extracted at step S20, and the curbstone information extracted as step S10 (S70).

A method of generating the virtual traffic lane at step S70 will be described in more detail through the following description.

For the description, in the road image collected at step S10, one point of a left traffic lane detected by an image processing technique is defined as lP(x,y) and in the distance information measured at step S30, one point on the curbstone acquired by a feature point extraction technique is defined as rP(x,y). In addition, a center point of a straight line linking lP(x,y) and rP(x,y) is defined as P(x,y), a distance between the image photographing device 5 and lP(x,y) as Ld, a distance between the distance measuring device 15 and rP(x,y) as Cd, a car axle distance CarW, a road width Rw, a distance between a right traffic lane of the vehicle and the curbstone as Cw, and a distance between the image photographing device 5 and the distance measuring device 15 and the straight line linking lP(x,y) and rP(x,y) as k (see FIG. 8).

Ld and Cd flexibly vary depending on an advancing direction of the vehicle or a lane-deviation degree of the center point of the vehicle from the traffic lane. A virtual traffic lane P(x,y) is acquired by the following method for the flexible variation in the present invention.

First, prior to acquiring the virtual traffic lane P(x,y), current positional information depending on the advancing direction of the vehicle is acquired from the global positioning system 80 and road information corresponding to the current position of the vehicle is extracted from the road information DB 85 on the basis of an x-axis position and a y-axis position. In addition, the virtual traffic lane P(x,y) is acquired in accordance with the following procedures.

1. lP(x) is acquired on the basis of the road information and information on the left traffic lane of the vehicle.
2. rP(x) is acquired on the basis of the road information and the curbstone information.
3. P(x,y) is acquired on the basis of lP(x) and rP(x).

First, lP(x) is acquired on the basis of the road information and the information on the left traffic lane as shown in Equation 1. lP(y) has been already determined by a k value.

$$lP(x)=(Rw*0.5)-(Ld+(CarW*0.5))$$ [Equation 1]

Where, lP(x) is a value calculating an image coordinate system as an actual distance X coordinate system by referring width information of the road on the basis of the distance information Ld between the image photographing device 5 and the traffic lane.

rP(x) is acquired on the basis of the road information and the curbstone information as shown in Equation 2. Likewise, rP(y) has been already determined by the k value.

$$rP(x)=(Rw*0.5)-((Cd-Cw)+(CarW*0.5))$$

$$rP(x)=rP(x)*-1$$ [Equation 2]

Where, a reason for multiplying rP(x) by −1 will be described. Since a direction of the left traffic lane and a direction of the curbstone information are opposite to each other, the curbstone information is multiplied by −1 in order to coincide directionality of a steering value.

In addition, rP(x) is a value calculated as the actual distance X coordinate system by referring to the width information of the road on the basis of the distance information Cd between the distance measuring device 15 and the curbstone.

The center point P(x,y) of the virtual traffic lane is acquired by using lP(x) and rP(x) acquired at the step as shown in Equation 3.

$$P(x)=(lp(x)+rP(x))/2$$ [Equation 3]

The acquired P(x,y) is transferred to a steering control calculator and the steering control calculator calculates a steering value on the basis of the virtual traffic lane and the center point of the vehicle (S80). More specifically, the steering control calculator acquires a turning radius by a two-wheeled motor vehicle model and acquires a steering angle a in accordance with the turning radius. A turning direction (steering direction) of the vehicle is determined depending on a sign of the steering angle a. The steering angle a acquired by the steering control calculator is transferred to the steering device controller and the steering device controller controls the steering device (e.g., steering wheel) in a clockwise direction or a counter clockwise direction to maintain a travelling traffic lane (S90). The series of steps are displayed through a display (S100).

According to the above description, it is possible to solve a difficulty in collecting images and misrecognition of a traffic lane which may be generated due to back light in image based traffic lane recognition for travelling control by closely photographing and detecting a left traffic lane of a vehicle. Further, it is possible to solve problems generated due to misrecognition and non-acquisition of right traffic lane information in the prior art and enables safe travelling while keeping a travelling traffic lane right even in a variable road environment, by using a curbstone information for travelling control in order to keep a traffic lane and prevent lane-deviation for a vehicle.

Some steps of the present invention can be implemented as a computer-readable code in a computer-readable recording medium. The computer-readable recording medium includes all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc. and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the preferred embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. An apparatus for keeping a traffic lane and preventing lane-deviation for a vehicle, comprising:
 a traffic lane recognizer extracting traffic lane information from an image of a road at the left side of the vehicle, the image photographed through an image photographing device;
 a curbstone recognizer extracting information on a curbstone positioned at the right side of the vehicle from distance information between a distance measuring device and a right ground surface of the vehicle measured by the distance measuring device;
 a position recognizer acquiring positional information of the vehicle by using a global positioning system and extracting road information corresponding to a current position of the vehicle from a road information database by using the acquired positional information;
 a traffic lane information integrator generating a virtual traffic lane on the basis of the extracted road information, traffic lane information, and curbstone information;
 a steering control calculator calculating a steering value for controlling a steering device of the vehicle on the basis of the generated virtual traffic lane and a center point of the vehicle; and a steering device controller controlling the steering device on the basis of the calculated steering value, wherein the traffic lane information integrator includes:

a traffic lane distance calculating unit calculating a distance between the image photographing device and the traffic lane by using the traffic lane information extracted by the traffic lane recognizer;

a curbstone distance calculating unit calculating a distance between the distance measuring device and the curbstone by using the curbstone information extracted by the curbstone recognizer; and a travelling traffic lane generating unit generating the virtual travelling traffic lane by using the distance values calculated by the traffic lane distance calculating unit and the curbstone distance calculating unit.

2. The apparatus for keeping a traffic lane and preventing lane-deviation for a vehicle of claim 1, wherein the distance measuring device measures a distance between the distance measuring device and the road surface at the right side of the vehicle by using a laser.

3. The apparatus for keeping a traffic lane and preventing lane-deviation for a vehicle of claim 1, wherein the image photographing device and the distance measuring device are, in a line, arranged on the same line of upper right and left ends of the vehicle.

4. The apparatus for keeping a traffic lane and preventing lane-deviation for a vehicle of claim 1, wherein the image photographing device is disposed on an upper left end of the vehicle and a view direction of the image photographing device is vertical to a ground surface.

5. The apparatus for keeping a traffic lane and preventing lane-deviation for a vehicle of claim 1, further comprising a display displaying the steering value for steering the steering device and a control result data received from the steering device controller.

6. The apparatus for keeping a traffic lane and preventing lane-deviation for a vehicle of claim 1, wherein the steering value for controlling the steering device includes information on a steering direction and a steering angle.

7. A method for keeping a traffic lane and preventing lane-deviation for a vehicle, comprising:

photographing a road at the left side of the vehicle through an image photographing device and extracting traffic lane information from the photographed road image;

measuring a distance between a distance measuring device and a right ground surface of the vehicle through the distance measuring device and extracting information on a curbstone positioned at the right side of the vehicle from the measured distance information;

acquiring positional information of the vehicle by using a global positioning system and extracting road information corresponding to a current position of the vehicle from a road information database by using acquired positional information;

generating a virtual traffic lane on the basis of the extracted road information, traffic lane information, and curbstone information;

calculating a steering value for controlling a steering device of the vehicle on the basis of the generated virtual traffic lane and a center point of the vehicle; and controlling the steering device on the basis of the calculated steering value, wherein the generating a virtual traffic lane on the basis of the extracted road information, traffic lane information, and curbstone information includes:

calculating unit calculating a distance between the image photographing device and the traffic lane by using the extracted traffic lane information and calculating a distance between the distance measuring device and the curbstone by using the curbstone information; and generating the virtual travelling traffic lane by using the calculated distance values.

8. The method for keeping a traffic lane and preventing lane-deviation for a vehicle of claim 7, further comprising displaying the steering value for steering the steering device and control result data according to controlling the steering device on the basis of the steering value to a driver.

9. The method for keeping a traffic lane and preventing lane-deviation for a vehicle of claim 7, wherein the steering value for controlling the steering device includes information on a steering direction and a steering angle.

10. The method for keeping a traffic lane and preventing lane-deviation for a vehicle of claim 7, wherein the photographing a road at the left side of the vehicle through an image photographing device photographs the road at the left side of the vehicle by disposing a view direction of the image photographing device to be vertical to the ground surface.

* * * * *